STEPHEN E. HARRIS
INVENTOR.
BY Samuel Lindenberg
Arthur Freilich
ATTORNEYS

June 6, 1967 S. E. HARRIS 3,324,295

FREQUENCY MODULATION DISCRIMINATOR FOR OPTICAL SIGNALS

Filed Nov. 7, 1963 2 Sheets-Sheet 2

STEPHEN E. HARRIS
INVENTOR.

BY Samuel Lindenberg
Arthur Freilich

ATTORNEYS

United States Patent Office 3,324,295
Patented June 6, 1967

3,324,295

FREQUENCY MODULATION DISCRIMINATOR FOR OPTICAL SIGNALS

Stephen E. Harris, Palo Alto, Calif., assignor to Research Corporation, New York, N.Y., a corporation of New York Filed Nov. 7, 1963, Ser. No. 322,163
7 Claims. (Cl. 250—199)

This invention relates to a method and apparatus for converting frequency modulated light to amplitude modulated light.

The recent development of lasers and other sophisticated light generating and controlling devices has significantly increased the likelihood that optical communication systems using light as the information carrier will in the near future be within the practical engineering realm. Light, in such systems, can be treated substantially in the same manner as electromagnetic waves in the radio frequency range are presently treated. That is, information can be impressed upon a light carrier having a desired wavelength using substantially conventional modulation principles, as for example, amplitude or frequency modulation. Of course however, new devices have to be developed for actually modulating the light carrier and subsequently demodulating the modulated signal.

Consequently, it is an object of this invention to provide a discriminator suitable for demodulating frequency modulated light by converting it to amplitude modulated light.

Briefly, the invention herein is based on the recognition that a periodic cosine transmission versus frequency characteristic exhibited by an optical device comprised of a birefringent element associated with appropriate polarizing elements can be used for converting frequency modulated light into amplitude modulated light.

Conversion is accomplished by biasing the element to effectively move its transmission characteristic so that the frequency of the signal carrier is in alignment with a point of 50% intensity transmission. A calcite or quartz crystal can be used as the birefringent element. The length of the crystal determines the sensitivity of the device and consequently, the amplitude of the output signal it provides for any degree of biasing, in response to deviations of the input signal.

The invention finds its principal utility as part of a receiver in a frequency modulation optical communication system. In addition however, since optical frequency modulators can, in the present state of art, be made considerably more efficient than amplitude modulators, the invention also proves useful as part of a transmitter in an optical communication system.

In an initial embodiment of the invention, a birefringent crystal, formed of calcite or some similar birefringent material and cut with its optic axis perpendicular to its length is placed between a pair of properly oriented cross polarizers, as for example, Nicol prisms. The crystal is rotatably mounted to thereby permit the angle of incidence between the frequency modulated light and the normal to the crystal to be selectively varied. Varying this angle has the effect of biasing the crystal to shift its transmission curve with respect to frequency. In this manner, a particular portion of the transmission characteristic curve can be shifted into frequency alignment with the optical carrier frequency.

In a second embodiment of the invention, in lieu of rotatably mounting the crystal to effect biasing, a series of quarter wave plates are provided on one side of the crystal with at least one of the plates being mounted for selective rotational movement.

Several other arrangements could be used to effect biasing. Several such arrangements are discussed in an article by H. G. Jerrard entitled, "Optical Compensators for Measurement of Elliptical Polarization," which appeared in the Journal of the Optical Society of America, volume 38, Number I, January 1948, pages 35–59.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1*a* schematically illustrates an optical device having a cosine transmission characteristic;

FIGURE 1*b* illustrates the intensity transmission characteristic of the device of FIGURE 1*a*;

Figures 4A, 4B, 4C, 4D:
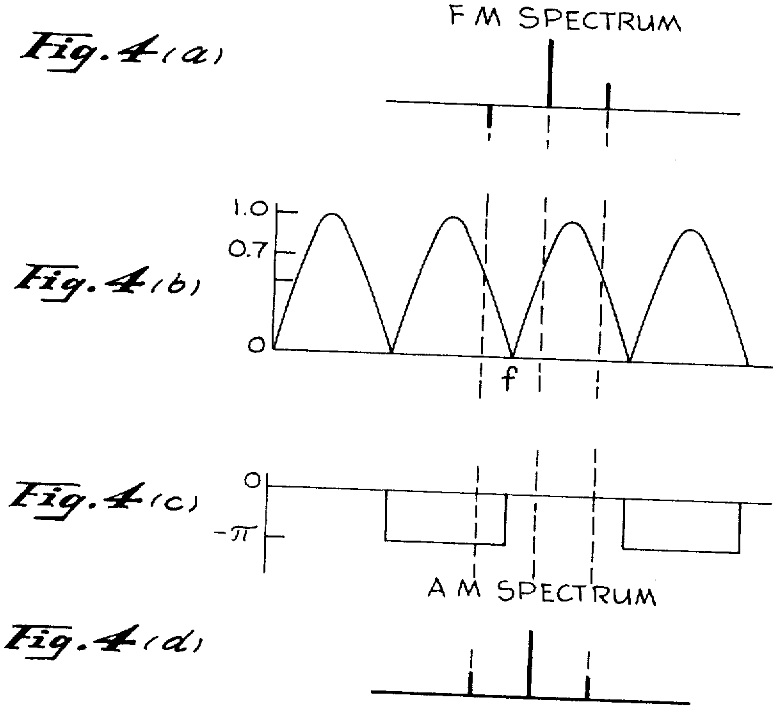

FIGURE 4*a* illustrates the carrier and sideband components of a small $\delta$ frequency modulated signal;

FIGURE 4*b* illustrates the amplitude variations of a cosine function;

FIGURE 4*c* illustrates the phase variations of a cosine function; and

FIGURE 4*d* illustrates the carrier and sideband components of an amplitude modulated signal.

Figure 1A:
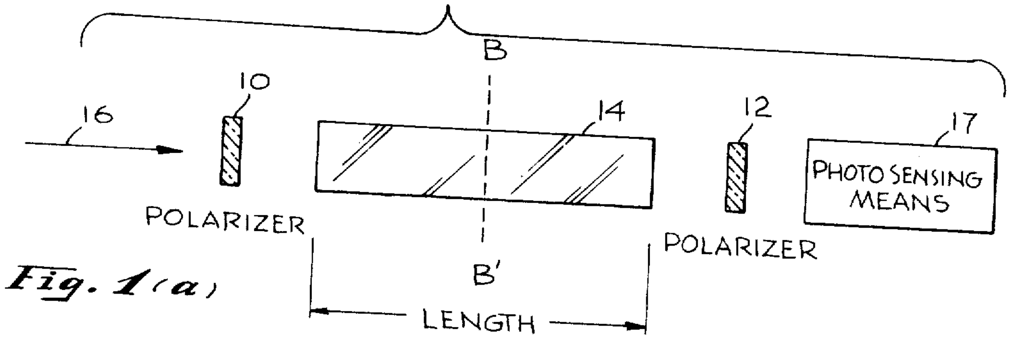

Attention is now called to FIGURE 1*a* which schematically illustrates an optical device for converting frequency modulated light to amplitude modulated light. The device of FIGURE 1*a* includes first and second polarizers 10 and 12 which can comprise Nicol prisms and which are spaced and aligned and oriented as either crossed or parallel polarizers. Mounted between and in alignment with the polarizers 10 and 12 is a crystal 14 of calcite or other birefringent material cut with its crystal axis perpendicular to its length. The polarizers 10 and 12 together with the crystal 14 present a cosine transmission characteristic to a light signal represented by the arrow 16, transmitted therethrough to a photo device 17 responsive to amplitude variations in light. This transmission characteristic, for the optical E field, through the device of FIGURE 1*a* can be written:

$$E_{out}=[\cos(Kf+\theta_0)]E_{in} \quad (1)$$

where K depends upon the relationship expressed in Equation 3, $f$ is the frequency and $\theta_0$ is the bias angle. The intensity transmission characteristic through the device of FIGURE 1*a* constitutes the transmission characteristic squared and is represented by:

$$I_{out}=[\cos^2(Kf+\theta_0)]I_{in} \quad (2)$$

Figure 1B:
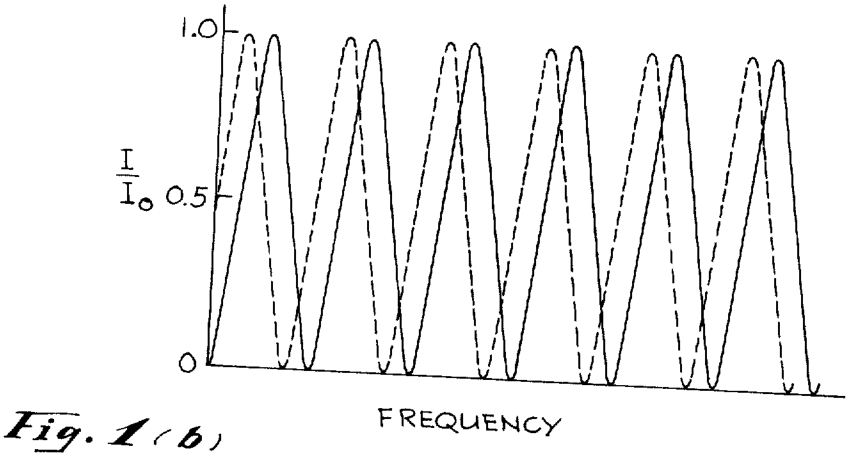

The intensity transmission characteristic is plotted in FIGURE 1*b*. The change in optical frequency necessary to go from minimum transmission to maximum transmission depends on the type and length of the crystal 14 used and is 15.8 kmc. for a 5 cm. crystal of calcite. The sensitivity of the device to changes in frequency is contained in the constant K which is given by:

$$K=\frac{\pi L\Delta n}{c}+\frac{\pi Lf_c}{c}\frac{d}{df}(\Delta_n) \quad (3)$$

where L represents the length of the crystal, $f_c$ is the carrier frequency, $c$ is the speed of light, and $\Delta n=n_e-n_0$ and depends on the type of crystal employed. For a calcite crystal $\Delta n$=.17, and the first term of K is about ten times as large as the second and of the same sign. The frequency interval between points of minimum and maximum transmission in the plot of FIGURE 1*b* depends on the type and length of the crystal used.

Although the type and length of the crystal determines its sensitivity and the period of its transmission function, different techniques are available to increase the effective length of a crystal without increasing its actual length. For example, different types of light bouncing schemes within the crystal can be utilized to increase its effective length or a number of shorter csystals can be arranged in series.

Figure 2:
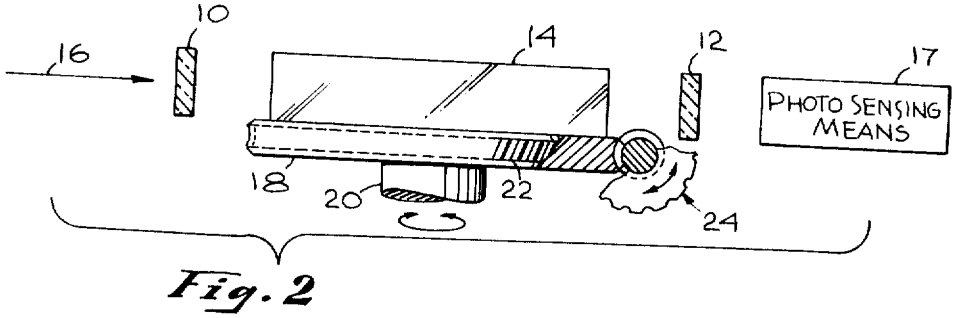
FIGURE 2 is a schematic illustration of one form of biasing means for shifting with respect to frequency the transmission characteristic of the optical device of FIGURE 1*a*.

The transmission curve of the device of FIGURE 1*a* can be shifted with respect to frequency by biasing the crystal 14. A first form of biasing means is shown in FIGURE 2 wherein the crystal is mounted on a turntable 18 supported on a rotatably mounted shaft 20. The turntable 18 is provided with a toothed rack 22 on the circumference thereof which is engaged with a rotatable worm gear 24. Consequently the turntable 18 can be selectively turned to vary the angle between the incident light 16 and the normal to the crystal 14. Rotation of the crystal through small angles varies $\theta_0$ of Equations 1 and 2 and is readily accomplished in practice inasmuch as about one-half of a degree of crystal rotation is required to shift the transmission curve by one-fourth fringe [dashed curve in FIGURE 1*b*]. The shift in the transmission curve results in part from the fact that the index of refraction of the extraordinary optical wave depends on the angle between the light and the crystal axis and in part from path length changes caused by double refraction.

Figure 3:
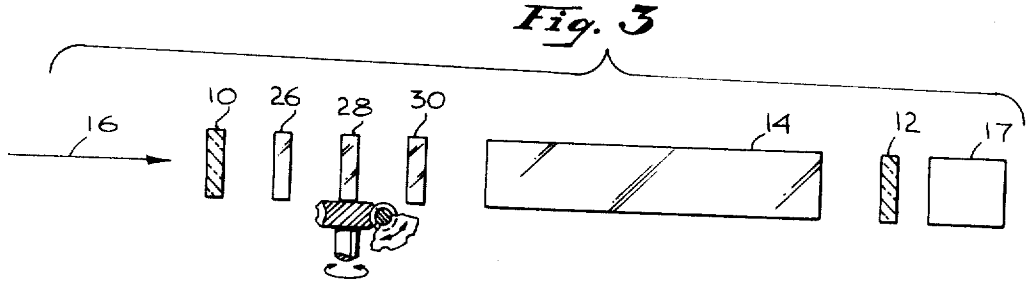
FIGURE 3 is a schematic diagram of a second form of biasing structure for shifting the transmission characteristic of the optical device of FIGURE 1*a*.

FIGURE 3 illustrates an alternative form of biasing means for the optical device of FIGURE 1*a* and comprises three aligned quarter wave plates 26, 28, 30 which are mounted between the crystal 14 and either one of the polarizers 10 or 12. The middle quarter wave plate 28 is rotatably mounted while the two end quarter wave plates 26 and 28 are fixed in position. Rotation of the middle plate has the same effect of shifting the transmission curve as rotation of the crystal did in FIGURE 2. Another reasonably satisfactory and extremely convenient biasing technique is to merely utilize one rotatable quarter wave plate between the crystal 14 and polarizer 10 or 12.

Several other methods of biasing can also be employed. For example, a thermal biasing technique in which uniform increases in temperature resulting in decreases in both $\Delta n$ and the length of the crystal (L), can be employed. As $\Delta n$ and L decrease, $\theta_0$ decreases and the bias of the optical device changes. For a 5 cm. crystal of calcite, a uniform temperature change of about .65° C. will shift the transmission characteristic by $\pi/2$, radians, or in other words from a minimum to a maximum for the same frequency.

In addition to thermal biasing, a still further biasing technique employing an electro-optic material can be utilized. In this latter technique, a properly oriented crystal of cuprous chloride with a direct current electric field applied perpendicularly to the direction of optical propagation therein can be utilized. If no voltage were applied to the cuprous chloride crystal, then it would be completely isotropic and would not effect $\theta$. On the other hand, the application of a voltage thereto varies its isotropic characteristic and consequently does effect $\theta_0$. Controlled effects of course can be achieved by controlling the voltage applied to the cuprous chloride crystal.

An analysis of the operation of the device of FIGURE 1*a* when biased by any of the aforedescribed methods begins with a frequency modulated light signal whose E vector can be written in the form $$E_{in}=\exp\,[j(2\pi f_c t+\delta \sin 2\pi f_m t)]$$

$$=\exp\,(j2\pi f_c t)\sum_{n-\infty}^{\infty} J_n(\delta)\,\exp\,(j\pi n f_m t)$$

where $f_c$ is the optical carrier frequency, $f_m$ the modulation frequency and $\delta$ is the deviation ratio equal to $f_d/f_m$ where $f_d$ represents frequency deviation.

Each spectral component of this input signal is multiplied by the transmission characteristic of the device, which as previously noted is simply $$E_{out}/E_{in}=\cos(Kf+\theta_0)$$

where non-essential phase factors have been omitted. The resulting expression is then multiplied by its complex conjugated to obtain the instantaneous intensity of the transmitted light, or the instantaneous current which the transmitted light would produce from a photo cathode. The result, obtained by using a Bessel function summation identity, is:

$$I_{out}=\frac{1}{2}+\cos 2\theta_1\left[\frac{J_o(2\delta \sin Kf_m)}{2}+\sum_{n=1}^{\infty}(-1)^n J_{2n}(2\delta \sin Kf_m)\cos 4\pi f_m t\right]$$
$$+\sin 2\theta_1\left[\sum_{n=0}^{\infty}(-1)^{n+1}J_{2n+1}(2\delta \sin K_2 f_m)\cos 2\pi(2n+1)f_m t\right]$$
$$I_{out}=\cos^2\,[\theta+\delta(\sin Kf_m)(\cos 2\pi f_m t)] \quad (5)$$

where $\Theta_1=Kf_c+\Theta_0$ and marks the position of the optical carrier on the transmission curve, i.e., $\Theta_1$ is the redefined bias angle determined by the bias of the transmission curve relative to the carrier.

To obtain amplitude modulated light at the fundamental frequency the bias is adjusted so that the carrier falls at a point of 50% intensity transmission; i.e., $\sin 2\Theta_1=1$, $\cos 2\Theta_1=0$. Equation 5 then reduces to:

$$I=\frac{1}{2}+J_1(2\delta \sin Kf_m)\cdot\cos 2\pi f_m t+$$
$$\text{[odd harmonic distortion terms]} \quad (6)$$

which is amplitude modulated light with the percent amplitude modulation given by:

$$m=\frac{I_{ac}}{I_{ac}}=2J_1(2\delta \sin Kf_m) \quad (7)$$

From Equation 7, it should be apparent that for optimum detection, i.e. maximum amplitude output, of frequency modulated signals whose modulation index $$\delta\left[\text{where } \sigma=\frac{\text{peak frequency deviation (fd)}}{\text{modulation frequency (fm)}}\right]$$

is sufficiently small, that the length of the birefringent crystal should be chosen such that ($\sin Ff_m$) is equal to unity, i.e., $Kf_m$ equal to $\pi/2$. For microwave modulation frequencies and calcite crystals, the optimum lengths are several centimeters.

FIGURE 4 demonstrates graphically how the device of FIGURE 1*a* acts to convert frequency modulated light to amplitude modulated light in the small $\delta$ optimum length case.

FIGURE 4*a* illustrates the carrier and first and second oppositely phase sideband components of a frequency modulated signal. In order to demodulate the frequency modulated signal represented in FIGURE 4*a*, the signal can be converted to an amplitude modulated signal by shifting by 180° the phase of one of the sideband components whereby amplitude variations corresponding to frequency variations in the frequency modulated signal are produced.

In order to shift the phase of one of the sideband components of the frequency modulated signal of FIGURE 1*a*, the signal can be passed through the optical device of FIGURE 1*a* having the cosine transmission characteristic illustrated in FIGURES 4*b* and 4*c*. FIGURE 4*b* illustrates variations in the amplitude of a signal transmitted through the device of FIGURE 1*a* as a function of the frequency of that signal. FIGURE 4*c* illustrates the phase variations of the cosine transmission function showing that successive half cycles of the function are actually 180° out of phase. By choosing the length of the crystal such that $Kf_m=\pi/2$, the period of the cosine transmission characteristic is established such that the frequency spacing between relative amplitudes of .707 (i.e. 45° points) is equal to the frequency spacing between the frequency modulated signal carrier component and each sideband component. Consequently, each of the frequency modulated signal components will be transmitted with substantially the same attenuation. By aligning the frequency of the carrier component with a 45° point on the rising slope of the cosine transmission characteristic as illustrated in FIGURE 4*b*, the lower and upper sideband components are automatically aligned with 45° points on the immediately preceding and immediately subsequent falling slopes of the cosine transmission function. It will be noted that since the lower sideband component is effected by a half cycle of the cosine transmission function which is 180° out of phase with the half cycle effecting the carrier and upper sideband components, the lower sideband component will be shifted 180° with respect to the carrier and upper sideband components. As a result of being transmitted through a device having the cosine transmission characteristic illustrated in FIGURES 4*b* and 4*c*, the resulting signal will include a carrier plus a pair of in-phase sideband components representing an amplitude modulated signal.

Although an attempt could be made to look at the development of the signal amplitude variations as a consequence of the signal frequency swinging around the point of 50% intensity transmission, this simple varying frequency viewpoint is not sufficient to actually describe the operation of the discriminator for small modulation. For instance, this viewpoint leads to the erroneous conclusion that any frequency deviation, no matter how small, may be converted to 100% amplitude modulation by a sufficiently long crystal having a very great sensitivity, K. It should be apparent from a consideration of the sidebands that a given small phase deviation puts a certain amount of energy in the sidebands and that no passive device can do more than convert the spectrum of FIGURE 4*a* to that of FIGURE 4*d*.

It is interesting to note however that if the analysis of the discriminator had been approached from the simple varying frequency viewpoint, i.e., if "*f*" in Equation 2 were set equal to $f_c+\delta f_m \cos 2\pi f_m t$ and Equation 2 were then expanded by using simple Bessel function identities, then the result would be identical to Equations 5 except that every ($\sin Kf_m$) would be replaced by ($Kf_m$). Thus, for very low modulating frequencies (small $Kf_m$), the exact solution 5 reduces to the inexact result of the simple varying frequency approach, i.e., that the amplitude of the output signal derived from the device is proportional to the frequency deviation of the input signal.

Experimental use of the birefringent discriminator shown in FIGURE 3, has demonstrated the direct demodulation of microwave frequency modulated light. The output of a pulsed ruby laser was frequency modulated at 2.4 gc. with a KDP cavity-type modulator, and after passing through the discriminator was incident upon a Sylvania SY-4302 microwave phototube. With about 100 $\mu$a of DC photocurrent in the tube and a modulation index $\delta\approx0.05$, the detected microwave signal out of the phototube was about −50 dbm., with a signal/noise ratio ≧20 db. When the discriminator was removed from the light path, no microwave output was observed, although the light transmission and the D.C. photocurrent approximately doubled. In this experiment the bias of the converter was found to be of little consequence. This is to be expected, since the ruby laser generally oscillates in a number of modes simultaneously, and in addition suffers frequency drifts due to thermal effects. Thus, the bias is continually varying during the course of one laser pulse, and at least some of the laser output frequencies will be properly biased to be detected.

There is a second mode of operation for the birefringent discriminator which allows one to detect the presence of microwave frequency modulation, and to test the operation of the device, without the need for a microwave photodetector. In this mode, the device is biased to a transmission minimum, i.e., $\sin 2\Theta=0$, $\cos 2\Theta_1$. The presence of microwave frequency modulation will then be evidenced by even harmonic amplitude modulation terms, which can be assumed not to be detected, plus a change in the average light intensity transmitted through the system which is given by $$I_{dc}=\frac{1}{2}[1-J_0(2\delta \sin Kf_m)] \quad (8)$$

In a series of experiments designed to test the validity of Equation 8, a Z-cut KDP modulator was operated at five different frequencies between 2 gc. and 11 gc. in both the FM and AM position. In addition, two calcite crystals of different lengths were used, both individually and in series; with the net result that $Kf_m$ could be varied in fifteen steps between zero and 130°. It may be shown that the D.C. level, when the modulator is run in the AM position is given by $$I_{dc}=\frac{1}{2}[1-J_0(2\delta)] \quad (9)$$

The ratio of the change in DC level when the modulator is run in the FM position, i.e., with the discriminator employed ($\Delta I_{FM}$), to the change in DC level when the modulator is run in the AM position, i.e., with the discriminator absent ($\Delta I_{AM}$) is then:

$$\frac{\Delta I_{FM}}{\Delta I_{AM}}=\frac{1-J_0(2\delta \sin Kf_m)}{1-J_0(2\delta)} \quad (10)$$

which reduces to $\sin^2 Kf_m$ for the small $\delta$ case.

The discussion thus far has implied the use of a monochromatic light source, since if a white source were used the amplitude modulation resulting from frequency modulated spectral components on positive slopes of the discriminator curve would be cancelled by opposing amplitude modulation resulting from spectral components on negative slopes of the discriminator curve. This difficulty may be circumvented by inserting a second identical calcite crystal and polarizers as a filter between the white light source to be used and the modulator. The filtered spectral density from the source is then periodic with frequency, and for proper adjustment of the bias the resulting amplitude modulated signal out of the discriminator will be one-fourth of that available when using a monochromatic source of the same intensity as the polychromatic source.

A significant feature of the invention which has not been thus far mentioned is its ability to completely suppress the fundamental component of an unwanted AM signal. An amplitude modulated light signal incident on the discriminator is $$E(t)=\sqrt{2}(1+m \cos \omega_m t) \exp (j\omega_c t) \quad (11)$$

and by appropriate mathematical analysis can be shown to result in an output intensity which is completely independent of the fundamental frequency of the incident signal.

This ability to supress amplitude modulation at the fundamental frequency can be noted in FIGURE 4, where it is seen that an AM signal can be converted by the discriminator to a quasi-FM signal.

It is pointed out that the bandwidth of the birefringent discriminator depends on many factors, such as whether the communication system in which the discriminator is used is a phase-modulation or frequency-modulation system. Inasmuch as present-day experimental optical communication systems are all of the small $\delta$ phase modulation type, only this case will be considered herein.

Assuming that the crystal length has been chosen so that the crystal is of optimum length at some center modulation frequency $f_{mo}$, the constant K is then equal to $\pi/2f_{mo}$. The conversion loss of the discriminator can be defined as $$L_{db}=10 \log \left( \frac{J_1^2 2\delta \sin \frac{f_m}{f_{mo}} \frac{\pi}{2}}{J_1^2(2\delta)} \right) \quad (12)$$

This expression gives the ratio of the power obtainable when an FM light signal with modulation frequency $f_m$ is incident on the birefringent discriminator followed by an AM-sensitive microwave photo device, to the power obtainable when an FM light signal with modulation frequency $f_{mo}$ (the frequency for which the crystal length has been specifically chosen) is incident on the same discriminator and photo device. The term $J_1$ is squared, since the power obtainable from a photodetector will vary as the optical intensity squared. For small $\delta$, the above equation becomes $$L_{db}=10 \log \sin^2 \left( \frac{f_m}{f_{mo}} \frac{\pi}{2} \right) \quad (13)$$

Plotting this expression, it can be seen that the 3-db. bandwidth is equal to $f_{mo}$. Thus, a calcite crystal which is chosen to be of optimum length at a modultion frequency of 20 gc. would be only 3-db. down for modulation frequencies between 10 and 30 gc.

From the foregoing, it should be apparent that an optical device has been disclosed herein which can be utilized as a discriminator for converting frequency modulated light to amplitude modulated light. Several different specific structural arrangements have been suggested for biasing the device to selectively shift its transmission characteristic so that the carrier frequency is aligned with a point of 50% intensity transmission. It has been indicated that the length of the crystal determines the period of its cosine transmission function and thus the sensitivity of the device. For maximum signal amplitude, where $\delta$ is small, (approximately 1.0 or less) the length should be chosen so that $Kf_m=\pi/2$. For all values of $\delta$ the length is actually chosen on the basis of the sensitivity required, the degree of distortion that can be tolerated, etc.

Although the primary area of utility for the device herein discussed is as a part of a receiver in a frequency modulation optical communication system, it is again reiterated that the device finds utility in other optical communication systems and as a detector for the presence of frequency modulation in certain frequency ranges.

What is claimed is:

1. A method of converting frequency modulated light including a carrier and a pair of oppositely phased sideband components into amplitude modulated light, said method comprising the steps of transmitting said frequency modulated light through a device exhibiting thereto a periodic amplitude versus frequency transmission characteristic in which the frequency spacing corresponding to one-fourth of a period is equal to the frequency spacing between said carrier and sideband components; and biasing said device to selectively shift said characteristic with respect to the frequencies of said carrier and sideband components.

2. A method of converting frequency modulated light including a carrier and a pair of oppositely phased sideband components into amplitude modulated light, said method comprising the steps of transmitting said frequency modulated light through a device exhibiting thereto a cosine transmission versus frequency characteristic and a period whose frequency interval is substantially twice that of the frequency spacing between said sideband components; and biasing said device to shift said characteristic for aligning a 45° point thereon with said frequency of said carrier component.

3. Apparatus for converting frequency modulated light including a carrier component into amplitude modulated light, said apparatus comprising an optical device having a periodic amplitude versus frequency transmission characteristic; means for transmitting said frequency modulated light through said optical device; means for selectively biasing said optical device to shift said characteristic with respect to the frequency of said carrier component; said optical device including a birefringent crystal and a pair of first and second polarizers; means for supporting said polarizers in spaced alignment and oriented for cross polarization; and means supporting said birefringent crystal in alignment between said first and second polarizers.

4. The apparatus of claim 3 wherein said birefringent crystal is cut with its crystal axis perpendicular to its length and in alignment with said first and second polarizers; and wherein said means for biasing said optical device includes means for selectively rotating said crystal for varying the angle of incidence between said frequency modulated light and said birefringent crystal.

5. The apparatus of claim 3 wherein said birefringent crystal is cut with its crystal axis perpendicular to its length and in alignment with said first and second polarizers; and wherein said means for biasing said optical device includes a plurality of aligned quarter waveplates disposed between one of said polarizers and said crystal; means for selectively rotating one of said quarter waveplates; said optical device including a birefringent crystal in a pair of first and second polarizers; means for supporting said polarizers in spaced alignment and oriented for cross polarization; and means supporting said birefringent crystal in alignment between said first and second polarizers.

6. Apparatus for converting frequency modulated light including a carrier and a pair of oppositely phased sideband components into amplitude modulated light, said appartus comprising an optical device having a periodic amplitude versus frequency transmission characteristic in which the frequency spacing corresponding to one-fourth of a period is equal to the frequency spacing between said carrier and sideband components; means for transmitting said frequency modulated light through said optical device; and means for selectively biasing said optical device to shift said characteristic with respect to the frequency of said carrier and sideband components.

7. Apparatus for converting frequency modulated light including a carrier and a pair of oppositely phased sideband components into amplitude modulated light, said apparatus comprising an optical device having a cosine amplitude versus frequency transmission characteristic; means for transmitting said frequency modulated light through said optical device; means for selectively biasing said optical device to shift said characteristic with respect to the frequency of said carrier component; said optical device including a birefringent crystal and a pair of first and second polarizers; means for supporting said polarizers in spaced alignment and oriented for crossed polarization; and means supporting said birefringent crystal in alignment between said first and second polarizers.

(References on following page)

References Cited

UNITED STATES PATENTS

| | | | |
|---|---|---|---|
| 2,600,962 | 6/1952 | Billings | 88—61 X |
| 2,707,235 | 4/1955 | Townes. | |
| 3,175,088 | 3/1965 | Herriott | 250—199 |
| 3,183,763 | 5/1965 | Koester | 88—61 X |
| 3,231,742 | 1/1966 | Siegman | 250—199 |
| 3,243,722 | 3/1966 | Billings | 250—199 X |

FOREIGN PATENTS

| | | |
|---|---|---|
| 608,711 | 3/1962 | Belgium. |

OTHER REFERENCES

Pages 2014–2023, Dec. 15, 1960—Bloembergen et al., Phys. Rev. vol. 120, No. 6.

Pages 492, 493, 538, 1950—Jenkins et al., Fundamentals of Optics, McGraw-Hill, 2nd ed.

Page 1331, August 1961—Kamal et al., Proc. I.R.E., vol. 49, No. 8.

JOHN W. CALDWELL, *Acting Primary Examiner.*

DAVID G. REDINBAUGH, *Examiner.*